Sept. 22, 1925.
C. L. WHITE
1,554,394
MULTIPLE DISK CLUTCH
Filed Aug. 24, 1922
2 Sheets-Sheet 1
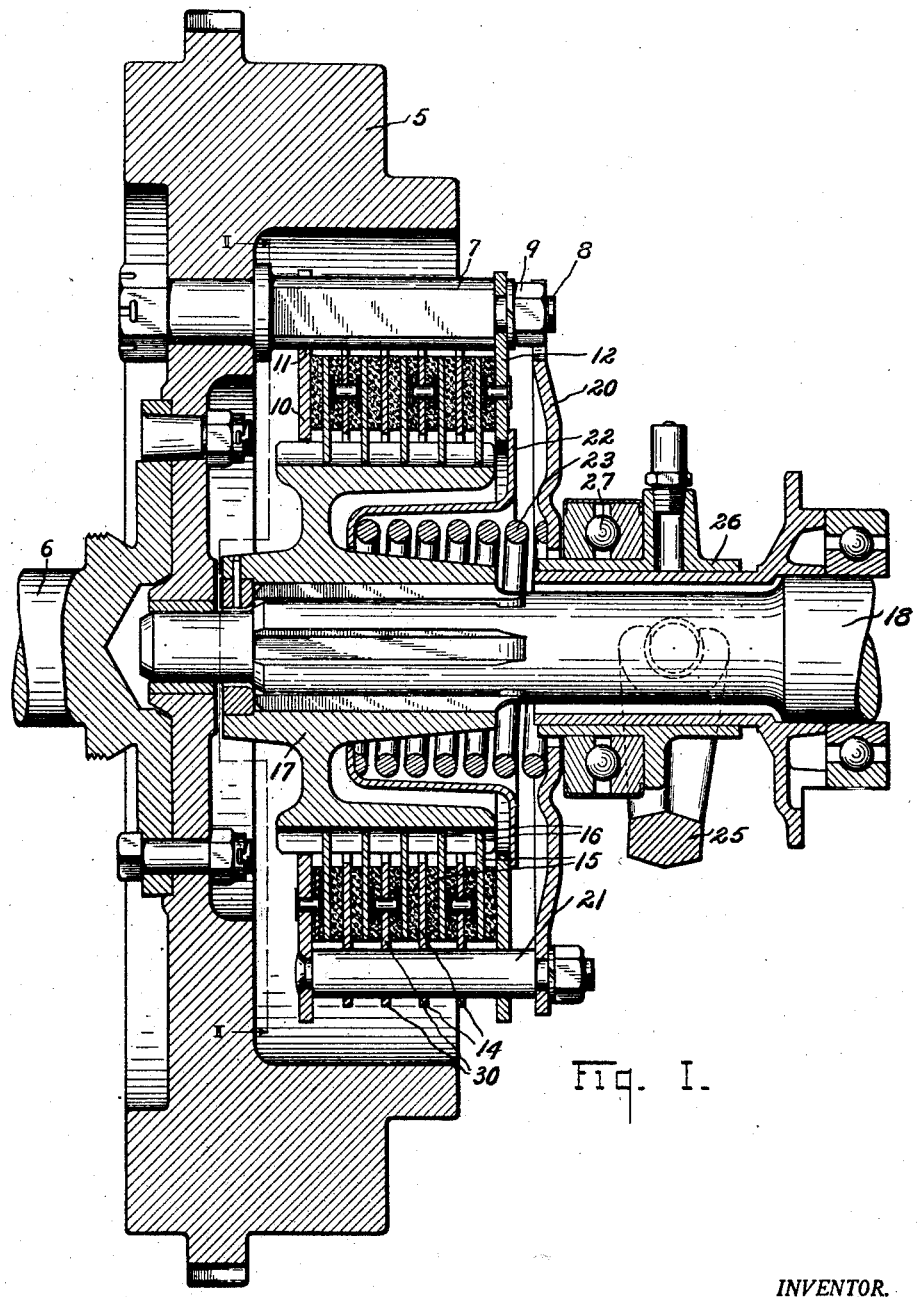
Fig. I.
INVENTOR.
Clyde L. White
BY Chester H Braselton
Solon J Broughton
ATTORNEYS.

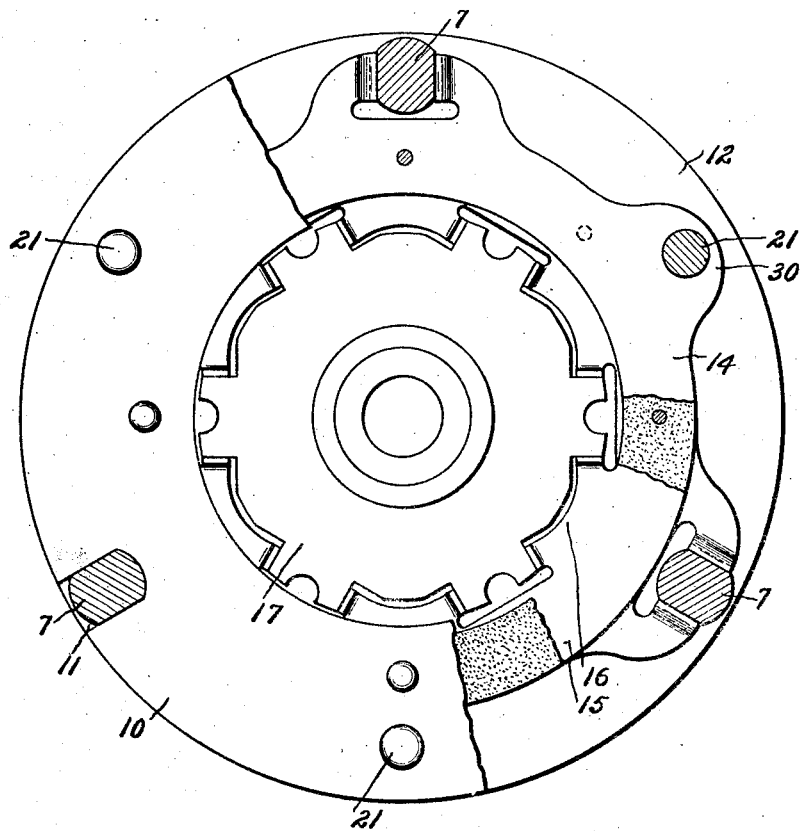

Patented Sept. 22, 1925.

1,554,394

UNITED STATES PATENT OFFICE.

CLYDE L. WHITE, OF TOLEDO, OHIO, ASSIGNOR TO THE WILLYS-OVERLAND COMPANY, OF TOLEDO, OHIO, A CORPORATION OF OHIO.

MULTIPLE-DISK CLUTCH.

Application filed August 24, 1922. Serial No. 584,035.

*To all whom it may concern:*

Be it known that I, CLYDE L. WHITE, a citizen of the United States, residing at Toledo, county of Lucas, State of Ohio, have invented certain new and useful Improvements in Multiple-Disk Clutches, of which I declare the following to be a full, clear, and exact description.

This invention relates to the construction of clutches and particularly to those employed in automotive vehicles for the transmission of power from the motor to the driving wheels. The clutch forming the subject of this invention is of the multiple disk type and has for one of its objects the simplification of the construction and assembly of such a clutch, thereby reducing the cost of manufacture.

In the accompanying drawing:

Figure I is a longitudinal sectional view of a motor fly wheel and clutch illustrating my invention, and Fig. II is a transverse cross sectional view taken on the line II—II of Fig. I.

The same reference numbers refer to the same parts in both views.

Referring to the drawing the fly wheel 5 carried by the engine crank shaft 6 has three studs 7 arranged one hundred and twenty degrees apart about its axis, the outer end of each stud being reduced as at 8 upon which is threaded a nut 9. An inner plate 10 of the clutch has three notches 11 cut in its periphery for receiving the three studs 7, the studs being preferably faced off on opposite sides to provide a larger bearing surface with the plate. An outer clutch plate 12 having three holes to receive the reduced portions 8 of the studs is rigidly secured to the studs by the nuts 9. Arranged between the aforesaid inner and outer plates are a series of driving disks 14 and a series of driven disks 15, the disks being arranged alternately and spaced by a suitable friction material. The driven disks 15 are each provided with inwardly extending projections 16 which engage the spider 17 keyed to driven shaft 18. A second outer plate 20 is supported from the inner plate 10 by three posts or studs 21 as shown, the outer plate having suitable notches formed in its periphery to avoid interference with the studs 7 and nuts 9 carried thereby. A cup 22 serves to transmit the force of a heavy spring 23 to the outer plate 12 and as the opposite end of this spring bears against the plate 20 it will be seen that the clutch plates are normally pressed together by the pressure of the spring. Release of the clutch is effected by movement of a lever 25 whereby the sleeve 26 presses against the plate 20 through a thrust bearing 27.

An important feature of my invention is that the studs 21, not only provide an operative connection between the plates 10 and 20 but by passing through and having a sliding fit with the plate 12 they also serve to support and guide the plate 20 thereby dispensing with other supporting and guiding means. Another important feature of my invention is that the driving disks 14 are each provided with three projections or ears 30 perforated to receive and have a sliding fit with the studs 21. The driving disks are thereby also supported and guided by the studs 21. This is a particularly advantageous feature in facilitating the assembly of the clutch and its connection to the fly wheel for it will be readily apparent that, unless the openings in the driving disks 14 which receive the posts 7 are in perfect alignment, the posts 7 can not be inserted and after the clutch has been assembled as a unit the spring pressure holding the disks together is too great to permit any relative movement of the disks except by the use of some special appliance. By causing the driving disks, therefore, to be properly positioned and guided by the studs 21 perfect alignment of the disks is insured with respect to the openings for the posts 7.

While I have shown and described in detail a particular structural embodiment as illustrative of my invention, I do not wish to be limited thereby, since various changes might be made therein without departing from the spirit and scope of the invention covered by the appended claims.

What I claim as new and desire to secure by Letters Patent is:

1. A clutch comprising a plurality of driving disks each having a portion adapted to engage a driving stud, a plurality of driven disks and means for insuring the assembly of said driving disks in a predetermined angular position whereby said stud may be applied to engage each of said drivings disks.

2. A clutch comprising a plurality of alternately positioned driving and driven disks each of said driving disks having an opening therein for receiving a driving stud, a plate adjacent said disks having an opening adapted to receive said stud and means carried by said plate for holding said disks in a predetermined angular position.

3. A clutch comprising a pair of plates having openings therein adapted to receive driving studs, a plurality of driving and driven disks between said plates, each of said driving disks having openings therein adapted to receive said studs and means connecting said plates for positioning said driving disks with their stud receiving openings in alinement.

4. A clutch comprising a pair of plates each having a plurality of spaced openings adjacent their periphery, a plurality of driving and driven disks therebetween said driving disks having a plurality of spaced openings, a plurality of driving posts extending through the openings in said plates and disks, a third plate, a spring between said third plate and one of said pair of plates and a plurality of posts secured to said third plate and to the other of said pair of plates, each of said driving disks and the first mentioned plate of said pair having openings to receive and have sliding connection with said posts.

5. In a clutch, a rotatably mounted element, a pair of plates, one of which is rigidly connected with said element and the other axially movable with respect thereto, alternate driving and driven disks supported for axial movement between said plates and adapted to be controlled by said axially movable plate, a spring holder extending within said plates and having an outwardly flanged portion engaging the outer face of said rigidly connected plate, a spring having one end carried by said holder, and a member supporting the other end of the spring and operatively connected with said axially movable plate.

6. In a clutch, a rotatably mounted element, a pair of spaced plates, one of which is rigidly connected to said element and provided with a central opening and the other of which is axially movable, alternate driving and driven disks mounted between said plates, a spring holder extending through the opening of said rigidly connected plate and having a portion engaging the outer face thereof, whereby to prevent axial movement of said holder, a spring having one end carried by said holder, and a member supporting the other end of said spring and operatively connected with said axially movable plate.

7. In a clutch, a rotatably mounted element, a pair of spaced plates, one of which is rigidly connected to said element and provided with a central opening and the other of which is axially movable, alternate driving and driven disks mounted between said plates, a spring holder extending through the opening of said rigidly connected plate and having a portion engaging the outer face thereof, whereby to prevent axial movement of said holder, a spring having one end carried by said holder, a member supporting the other end of said spring, means operatively connecting said member with said axially movable plate and forming a support for said driving disks, and means for supporting said driven disks.

In testimony whereof, I affix my signature.

CLYDE L. WHITE.